(12) United States Patent
Sohma (10) Patent No.: US 7,679,348 B2
(45) Date of Patent: Mar. 16, 2010

(54) SWITCHING REGULATOR (75) Inventor: Shohtaroh Sohma, Osaka (JP)

(73) Assignee: Ricoh Company, Ltd,, Tokyo (JP)

( * ) Notice: Subject to any disclaimer, the term of this patent is extended or adjusted under 35 U.S.C. 154(b) by 373 days.

(21) Appl. No.: 11/723,678

(22) Filed: Mar. 21, 2007

(65) Prior Publication Data
US 2007/0247131 A1 Oct. 25, 2007

(30) Foreign Application Priority Data
Mar. 23, 2006 (JP) ............... 2006-081520

(51) Int. Cl.
G05F 1/56 (2006.01)
G05F 1/565 (2006.01)
(52) U.S. Cl. ............ 323/282; 323/283; 323/284; 323/285; 323/288
(58) Field of Classification Search ......... 323/282–290
See application file for complete search history.

(56) References Cited

U.S. PATENT DOCUMENTS
7,061,213 B2 * 6/2006 Yoshida .............. 323/224
7,151,361 B2 * 12/2006 Xi .................... 323/222
2007/0057658 A1 * 3/2007 Hasegawa ............. 323/282

FOREIGN PATENT DOCUMENTS
JP 2000-201473 7/2000
JP 3647811 2/2005
JP 2005-160254 6/2005

* cited by examiner

*Primary Examiner*—Jeffrey L Sterrett
*Assistant Examiner*—Fred E Finch, III
(74) *Attorney, Agent, or Firm*—Dickstein Shapiro LLP

(57) ABSTRACT

A switching regulator is disclosed that is able to operate with low power consumption and able to prevent variation of an output voltage. The switching regulator operates in a PWM control mode and a PFM control mode, and includes a switching unit; an error amplification circuit for amplifying an error voltage between an output voltage and a first reference voltage; a slope circuit for generating a slope signal; a reference voltage generation circuit for generating a second reference voltage for determining a time interval of an ON state in the PFM control mode; a multiplexer for outputting one of the second reference voltage and an output voltage from the error amplification circuit; a comparison circuit for comparing an output voltage from the slope circuit to an output voltage from the multiplexer; and an oscillation circuit for determining a timing of the ON state in the PWM control mode.

6 Claims, 6 Drawing Sheets

FIG.1

FIG.3A reference voltage 104, output of slope circuit 105, output of multiplexer 106, output of error amplification circuit 103

FIG.3B output of comparison circuit 107

FIG.3C control signal 114

FIG.3D output signal 117

FIG.3E output signal 118

FIG.3F output signal 119

FIG.3G output signal 120

FIG.4

SWITCHING REGULATOR

BACKGROUND OF THE INVENTION

1. Field of the Invention

The present invention relates to a switching regulator having low power consumption and able to operate efficiently under low workload conditions.

2. Description of the Related Art

In the related art, it is well known that a switching regulator is set to operate in a PWM control mode under usual workload conditions, and is set to operate in a PFM control mode under low workload conditions.

In the PWM control mode, the switching regulator is set to operate at a fixed frequency, and an ON-duty in each cycle is modulated to adjust an output voltage. In the PFM control mode, the ON-duty in each cycle (the time interval in the ON state) is fixed, but the operating frequency is modulated to adjust the output voltage. In addition, there is a pseudo-PFM control mode, in which the ON timing is controlled at a fixed frequency, and the ON timing is skipped, thereby, realizing performance close to the PFM control mode.

For example, Japanese Patent Gazette No. 3647811 (hereinafter referred to as "reference 1") discloses a DC-DC conversion circuit in which an output voltage of a converter is detected, and based on an error output voltage generated from a difference between a divisional voltage of the output voltage and a reference voltage from a reference voltage source, the driving mode of the converter is switched from the PWM mode to the pseudo PFM mode, or from the pseudo PFM mode to the PWM mode.

However, in the invention disclosed in reference 1, since the pseudo PFM mode is utilized, it is necessary that a circuit of large power consumption, such as an oscillation circuit for outputting the fixed frequency, be constantly in operation. In addition, in the pseudo PFM mode disclosed in reference 1, a ripple voltage occurs in the output voltage.

SUMMARY OF THE INVENTION

The present invention may solve one or more problems of the related art.

A preferred embodiment of the present invention may provide a switching regulator able to operate with low power consumption and able to prevent variation of an output voltage.

According to an aspect of the present invention, there is provided a switching regulator operating in one of a PWM control mode and a PFM control mode, comprising:

a switching unit that performs switching between the PWM control mode and the PFM control mode;

an error amplification circuit that amplifies an error voltage between a voltage proportional to an output voltage and a first reference voltage;

a slope circuit that generates a slope signal;

a reference voltage generation circuit that generates a second reference voltage for determining a time interval of an ON state in the PFM control mode;

a multiplexer that outputs one of the second reference voltage and an output voltage from the error amplification circuit;

a comparison circuit that compares an output voltage from the slope circuit to an output voltage from the multiplexer; and an oscillation circuit that determines a timing of the ON state in the PWM control mode.

According to the present invention, it is possible to provide a switching regulator able to operate with low power consumption and able to prevent variation of an output voltage.

As an embodiment, the time interval of the ON state in the PFM control mode is greater than a time interval of an ON state in the PWM control mode.

According to the present embodiment, it is possible to stabilize the inductor current when switching between the PWM control mode and the PFM control mode, and prevent repetition of unnecessary switching operations.

As an embodiment, the time interval of the ON state in the PFM control mode is determined by at least one of the second reference voltage and a slope of the slope signal. According to the present embodiment, it is possible to appropriately set the ON state time interval in different operation modes responsive to the circuit configuration.

As an embodiment, the oscillation circuit is stopped in the PFM control mode.

According to the present embodiment, since the oscillation circuit is not used in the PFM control mode, by stopping the oscillation circuit in the PFM control mode, it is possible to reduce the power consumption.

As an embodiment, the switching regulator further comprises:

a delay unit that delays an output signal from the switching unit by a predetermined time period.

As an embodiment, the switching regulator repeatedly performs a predetermined number of switching operations within the predetermined time period.

According to the present embodiment, switching the operation is performed after the operation of the switching regulator reaches a steady state.

These and other objects, features, and advantages of the present invention will become more apparent from the following detailed description of preferred embodiments given with reference to the accompanying drawings.

BRIEF DESCRIPTION OF THE DRAWINGS

FIG. 2A through FIG. 2H are waveform diagrams illustrating operations of the switching regulator 100 in the PWM control mode;

FIG. 3A through FIG. 3G are waveform diagrams illustrating operations of the switching regulator 100 in the PFM control mode;

FIG. 5A through FIG. 5F are waveform diagrams illustrating operations of the switching regulator 200 when the operation mode of the switching regulator 200 is switched from the PWM control mode to the PFM control mode; and FIG. 6A through FIG. 6F are waveform diagrams illustrating operations of the switching regulator 200 when the operation mode of the switching regulator 200 is switched from the PFM control mode to the PWM control mode.

DESCRIPTION OF THE PREFERRED EMBODIMENTS

Below, preferred embodiments of the present invention are explained with reference to the accompanying drawings.

In the present invention, the switching regulator includes an oscillation circuit that determines a timing of the ON state in the PWM (Pulse Wide Modulation) control mode, a reference voltage generation circuit that generates a reference voltage for determining a time interval of an ON state in the PFM (Pulse Frequency Modulation) control mode, a multiplexer that outputs one of the reference voltage from the reference voltage generation circuit and an output voltage from an error amplification circuit. In the PWM control mode or the PFM control mode, the multiplexer switches the voltage input to a comparison circuit, thereby, determining the ON timing in the PWM control mode or the ON state time interval in the PFM control mode.

First Embodiment

Figure 1:
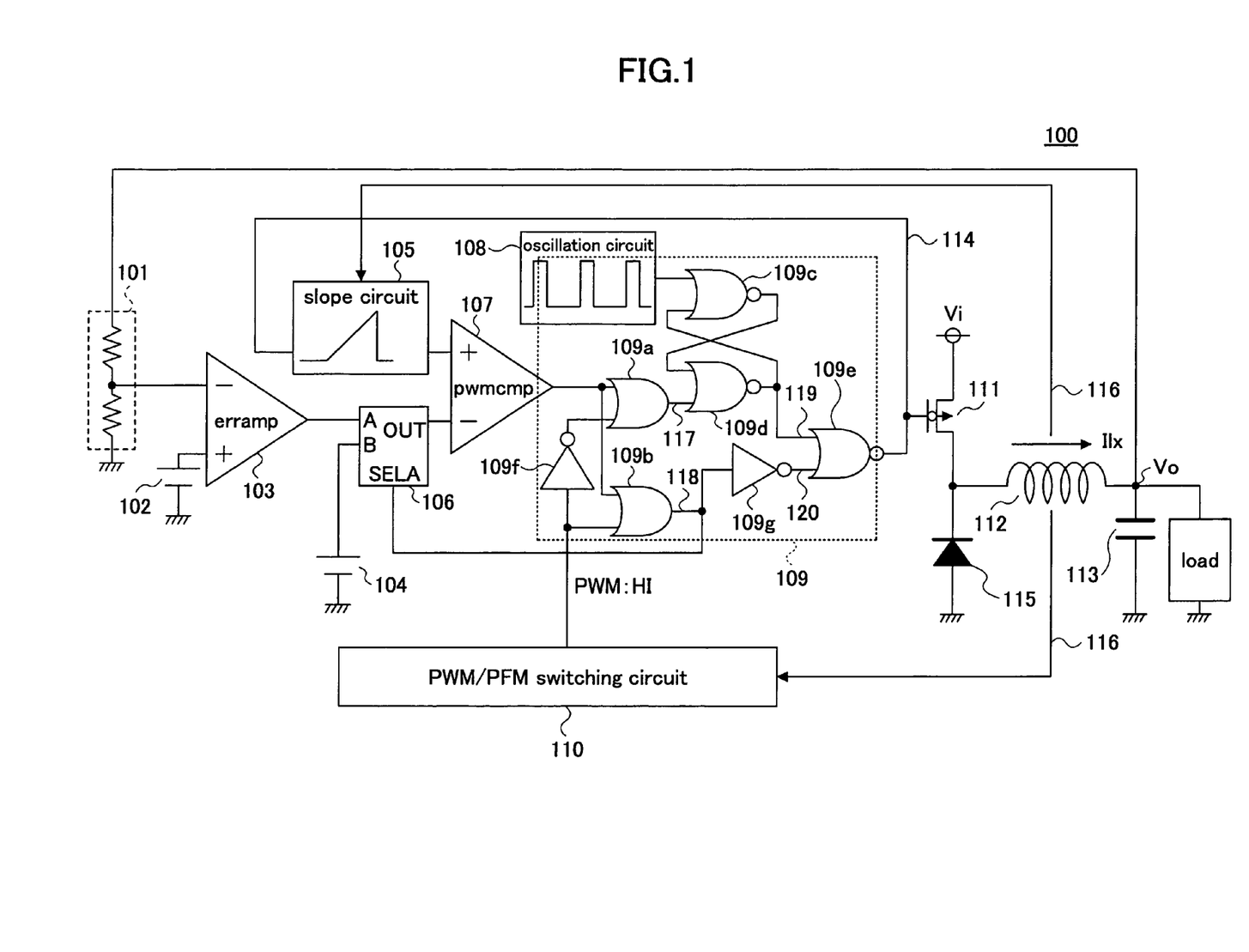
FIG. 1 is a block diagram illustrating a switching regulator 100 according to a first embodiment of the present invention.

FIG. 1 is a block diagram illustrating a switching regulator 100 according to a first embodiment of the present invention.

As shown in FIG. 1, the switching regulator 100 is a step-down switching regulator operating either in a PWM control mode under usual workload conditions, or in a PFM control mode under low workload conditions. The switching regulator 100 includes a voltage-divider 101, an error amplification circuit 103, a slope circuit 105, a multiplexer 106, a comparison circuit 107, an oscillation circuit 108, a logic circuit 109, a PWM/PFM switching circuit 110, a switching transistor 111, an inductor 112, an output condenser 113, and a rectification diode 115.

In the switching regulator 100, when the switching transistor 111 is turned ON, an output voltage Vo is output from an output terminal, and energy corresponding to a difference between the input voltage and the output voltage is stored in the inductor 112. When the switching transistor 111 is turned OFF, the energy stored in the inductor 112 is output from the output terminal as the output voltage Vo. Thereby, the switching regulator 100 outputs a stable direct-current voltage.

The voltage-divider 101 includes two resistances in series. The error amplification circuit 103 amplifies an error voltage between the output voltage from the voltage-divider 101 and a reference voltage 102, and outputs the amplified error voltage.

The slope circuit 105 generates a specified slope signal.

Specifically, when the switching transistor 111 is turned ON, the slope circuit 105 generates a slope signal with a value of an inductor current 116 of the inductor 112 superposed. When the switching transistor 111 is turned OFF, the slope circuit 105 outputs a preset offset voltage.

The multiplexer 106 outputs one of a reference voltage 104 and the output voltage from the error amplification circuit 103 based on a select input signal. Specifically, when the select input signal is at a high level, the multiplexer 106 outputs the output voltage from the error amplification circuit 103, and when the select input signal is at a low level, the multiplexer 106 outputs the reference voltage 104.

The comparison circuit 107 compares the output voltage from the slope circuit 105 to the output voltage from the multiplexer 106, and outputs the comparison results.

The oscillation circuit 108 outputs a clock signal of a preset frequency.

The logic circuit 109 generates a control signal 114 from the output signal of the PWM/PFM switching circuit 110, the output signal of the oscillation circuit 108, the output signal of the comparison circuit 107, and the control signal 114 is applied on the gate of the switching transistor 111 to control ON and OFF of the switching transistor 111. The logic circuit 109 is described in detail below.

The PWM/PFM switching circuit 110 generates a signal for switching the operation mode of the switching regulator 100 from the PWM control mode to the PFM control mode, or from the PFM control mode to the PWM control mode.

Based on the inductor current value 116 of the inductor 112, the PWM/PFM switching circuit 110 detects an inductor current discontinuous mode, in which the inductor current has a zero value and the workload is low, and an inductor current continuous mode, in which the inductor current does not have the zero value and the workload is of a usual value. When the inductor current discontinuous mode is detected, the PWM/PFM switching circuit 110 generates a low-level (L-level) signal to switch the operation mode of the switching regulator 100 to the PFM control mode; when the inductor current continuous mode is detected, the PWM/PFM switching circuit 110 generates a high-level (H-level) signal to switch the operation mode of the switching regulator 100 to the PWM control mode.

One end of the switching transistor 111 is connected to a power supply to receive a power voltage Vi; the other end of the switching transistor 111 is grounded via the rectification diode 115. One end of the inductor 112 is connected to the connection point between the switching transistor 111 and the rectification diode 115, and the other end of the inductor 112 is connected to the output terminal of the switching regulator 100. The output condenser 113 is between the output terminal of the switching regulator 100 and ground.

One end of the voltage-divider 101 is grounded, and the other end of the voltage-divider 101 is connected to the output terminal of the switching regulator 100. The voltage-divider 101 outputs a voltage proportional to the output voltage Vo of the switching regulator 100 from the output terminal of the voltage-divider 101.

The output terminal of the voltage-divider 101 is connected to an inverted input terminal of the error amplification circuit 103. The reference voltage 102 is applied on the non-inverted input terminal of the error amplification circuit 103, and the error amplification circuit 103 amplifies the error voltage between the output voltage of the voltage-divider 101 and the reference voltage 102, and outputs the amplified error voltage.

The output terminal of the error amplification circuit 103 is connected to one of the input terminals of the multiplexer 106, and the output voltage of the error amplification circuit 103 is input to the one input terminal of the multiplexer 106. The reference voltage 104 is input to another input terminal of the multiplexer 106. The select input signal, which is generated by the logic circuit 109, is input to a select input terminal of the multiplexer 106.

The output terminal of the multiplexer 106 is connected to an inverted input terminal of the comparison circuit 107, and either the output voltage of the error amplification circuit 103 or the reference voltage 104 is applied on the inverted input terminal of the comparison circuit 107.

The output terminal of the slope circuit 105 is connected to a non-inverted input terminal of the comparison circuit 107, and the output voltage of the slope circuit 105 is applied on the non-inverted input terminal of the comparison circuit 107. The output terminal of the comparison circuit 107 is connected to an input terminal of the logic circuit 109.

The logic circuit 109 includes OR circuits 109a and 109b, NOR circuits 109c, 109d, and 109e, and inverter circuits 109f and 109g.

One input terminal of each of the OR circuit 109a and the OR circuit 109b is connected to the output terminal of the comparison circuit 107. Another input terminal of the OR circuit 109a is connected to the output terminal of the PWM/PFM switching circuit 110 via the inverter circuit 109f. Another input terminal of the OR circuit 109b is directly connected to the output terminal of the PWM/PFM switching circuit 110. The output terminal of the OR circuit 109a is connected to one input terminal of the NOR circuit 109d, and an output signal 117 of the OR circuit 109a is applied on the one input terminal of the NOR circuit 109d.

The output terminal of the OR circuit 109b is connected to both the input terminal of the inverter circuit 109g and the select input terminal of the multiplexer 106;, thus, an output signal 118 of the OR circuit 109b is applied on both the input terminal of the inverter circuit 109g and the select input terminal of the multiplexer 106. It should be noted that the output signal 118 of the OR circuit 109b serves as the select input signal of the multiplexer 106.

The NOR circuits 109c, 109d constitute a latch flip-flop block. One input terminal of the NOR circuit 109c is connected to the output terminal of the oscillation circuit 108, and the clock signal from the oscillation circuit 108 is input to the NOR circuit 109c. The output terminal of the NOR circuit 109c is connected to the other input terminal of the NOR circuit 109d. In addition, the other input terminal of the NOR circuit 109c is connected to the output terminal of the NOR circuit 109d, and is connected to one input terminal of the NOR circuit 109e. Thus, an output signal 119 of the NOR circuit 109d is applied on the one input terminal of the NOR circuit 109e. The other one input terminal of the NOR circuit 109e is connected to the output terminal of the inverter circuit 109g, and an output signal 120 of the inverter circuit 109g is applied on the other one input terminal of the NOR circuit 109e.

The output terminal of the NOR circuit 109e is connected to the gate of the switching transistor 111, thus the output signal of the NOR circuit 109e (namely, the output signal of the logic circuit 109) servers as the control signal 114 which controls ON or OFF of the switching transistor 111.

Below, descriptions are made of operations of the switching regulator 100 in the PWM control mode.

FIG. 2A through FIG. 2H are waveform diagrams illustrating operations of the switching regulator 100 in the PWM control mode.

Figures 2A, 2B:
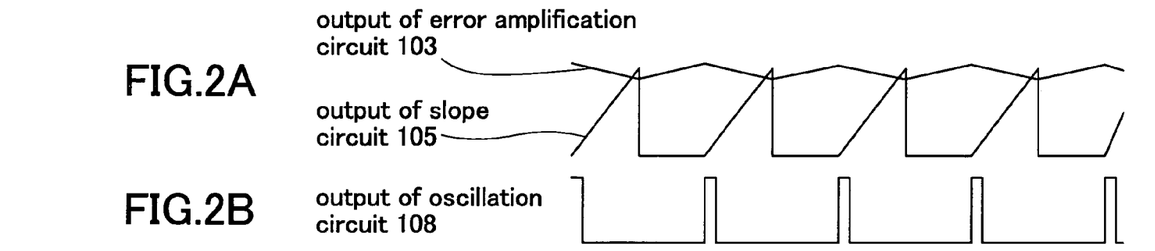
Figure 2C:
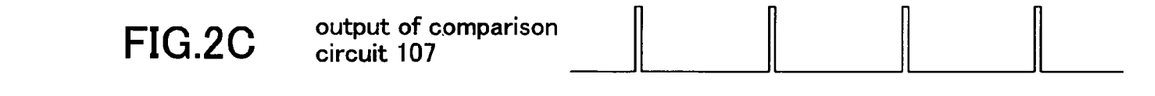
Figure 2D:
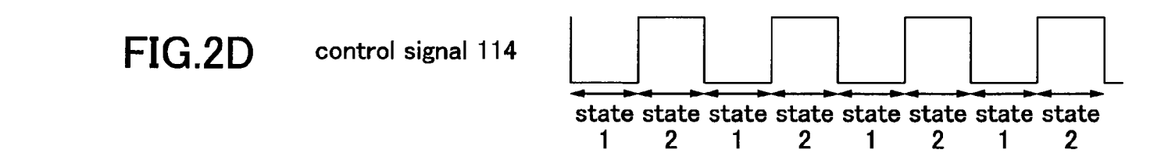
Figure 2E:
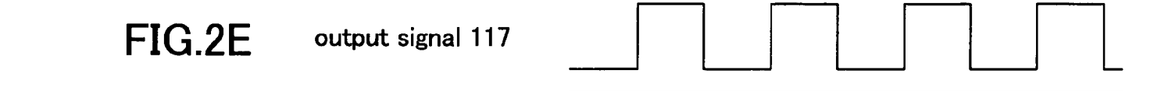
Figure 2F:
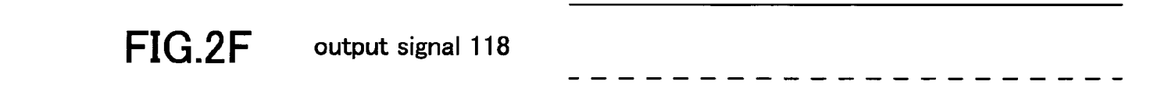
Figure 2G:
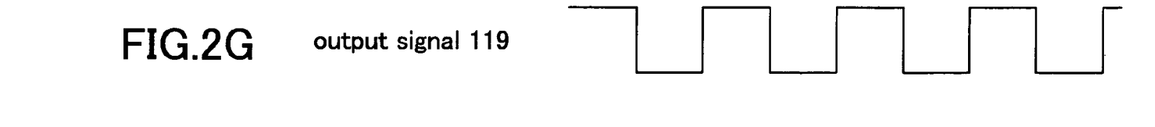
Figure 2H:
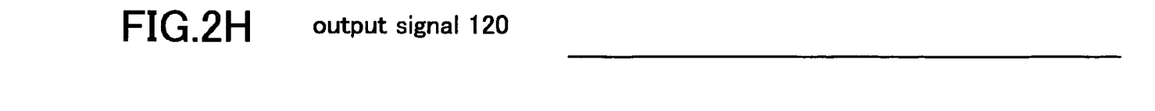

Specifically, FIG. 2A illustrates the output signal of the error amplification circuit 103 and the output signal of the slope circuit 105 in the PWM control mode; FIG. 2B illustrates the output signal of the oscillation circuit 108 in the PWM control mode; FIG. 2C illustrates the output signal of the comparison circuit 107 in the PWM control mode; FIG. 2D illustrates the waveform of the control signal 114 from the logic circuit 109; FIG. 2E illustrates the waveform of the output signal 117 from the OR circuit 109a, FIG. 2F illustrates the waveform of the output signal 118 from the OR circuit 109b, FIG. 2G illustrates the waveform of the output signal 119 from the NOR circuit 109d, and FIG. 2H illustrates the waveform of the output signal 120 from the inverter circuit 109g.

In FIG. 2D, "state 1" indicates a state in which the switching transistor 111 is turned ON; "state 2" indicates a state in which the switching transistor 111 is turned OFF.

In the PWM control mode, the output signal of the PWM/PFM switching circuit 110 is at the high level. Due to this, the high level signal is constantly applied on one of the input terminals of the OR circuit 109b, hence, the output signal 118 of the OR circuit 109b is constantly at the high level in the PWM control mode. Since the output signal 118 of the OR circuit 109b serves as the select input signal of the multiplexer 106, when the select input signal of the multiplexer 106 is at the high level, the multiplexer 106 constantly outputs the output voltage from the error amplification circuit 103 in the PWM control mode.

First, descriptions are made of operations of the switching regulator 100 in the state 1.

In the state 1, since the switching transistor 111 is turned ON, the control signal 114, which is applied on the gate of the switching transistor 111, is at the low level.

In the state 1, an inductor current I1x of the inductor 112 increases, and charges are applied to the output condenser 113, which serves as a smoothing circuit; thus, the output voltage Vo of the switching regulator 100 increases. For this reason, the output voltage from the error amplification circuit 103 decreases. In addition, since the control signal 114 is at the low level, the slope circuit 105 generates a slope signal and outputs the slope signal.

The comparison circuit 107 compares the slope signal output from the slope circuit 105 to the output signal from the error amplification circuit 103, and outputs a high level signal when the slope signal is higher than the output signal from the error amplification circuit 103.

When the output signal of the comparison circuit 107 becomes the high level, the high level signal from the comparison circuit 107 and a high level signal obtained by inverting the output signal of the PWM/PFM switching circuit 110 are input to the OR circuit 109a. As a result, the output signal 117 of the OR circuit 109a becomes the high level. When the output signal 117 of the OR circuit 109a becomes the high level, the output signal 119 of the latch flip-flop block constituted by the NOR circuits 109c, 109d becomes the low level.

Note that in this process, the output signal 118 from the OR circuit 109b is constantly at the high level, thus, the output signal 120 from the inverter circuit 109g is constantly at the low level.

Since the low level output signal 119 and the low level output signal 120 are input to the NOR circuit 109e, the output signal of the NOR circuit 109e (namely, the control signal 114) becomes the high level. When the control signal 114 becomes the high level, the switching transistor 111 is turned off, and the switching regulator 100 transits to the state 2, as illustrated in FIG. 2D.

Next, descriptions are made of operations of the switching regulator 100 in the state 2.

In the state 2, since the switching transistor 111 is turned OFF, the inductor current I1x of the inductor 112 decreases, and charges flow out of the output condenser 113, which serves as a smoothing circuit; thus, the output voltage Vo decreases. For this reason, the output voltage from the error amplification circuit 103 increases. In addition, since the control signal 114 is at the high level, the slope circuit 105 outputs the offset voltage.

The comparison circuit 107 compares the offset voltage output from the slope circuit 105 to the output signal from the error amplification circuit 103. Here, since the offset voltage output from the slope circuit 105 is lower than the output signal from the error amplification circuit 103, the comparison circuit 107 outputs a low level signal.

When the output signal of the comparison circuit 107 becomes the low level, the low level signal from the comparison circuit 107 is input to one input terminal of each of the OR circuit 109a and the OR circuit 109b. Here, the low level signal from the comparison circuit 107 and a low level signal obtained by inverting the output signal of the PWM/PFM switching circuit 110 are input to the OR circuit 109a. As a result, the output signal 117 of the OR circuit 109a becomes the low level.

However, since the output signal 119 of the latch flip-flop block constituted by the NOR circuits 109c, 109d remains to be at the low level until the clock signal from the oscillation circuit 108 is input, the output signal 119 of the NOR circuit 109d remains to be the low level.

Note that in this process, the output signal 120 from the inverter circuit 109g is constantly at the low level, hence, the output signal of the NOR circuit 109e (namely, the control signal 114) remains to be at the high level.

In the state 2, when the clock signal from the oscillation circuit 108 is input, the output signal 119 of the NOR circuit 109d becomes the high level, and the output signal of the NOR circuit 109e (namely, the control signal 114) becomes the low level. When the control signal 114 becomes the low level, the switching transistor 111 is turned on, and the switching regulator 100 transits to the state 1 again.

In this way, the switching regulator 100 repeatedly transits from the state 1 to the state 2, and from the state 2 to the state 1.

Below, descriptions are made of operations of the switching regulator 100 in the PFM control mode.

FIG. 3A through FIG. 3G are waveform diagrams illustrating operations of the switching regulator 100 in the PFM control mode.

Figure 3A:
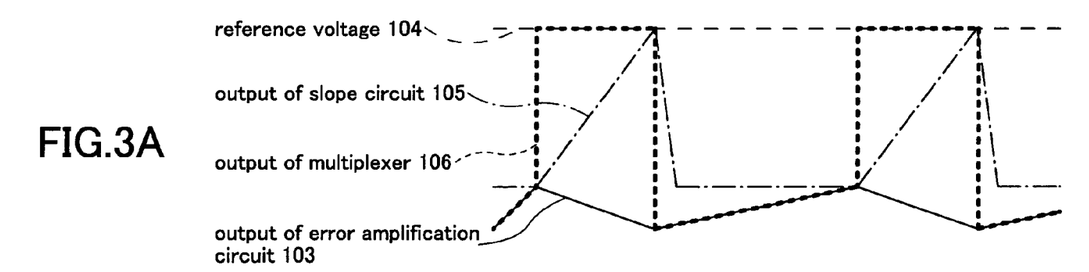
Figure 3B:
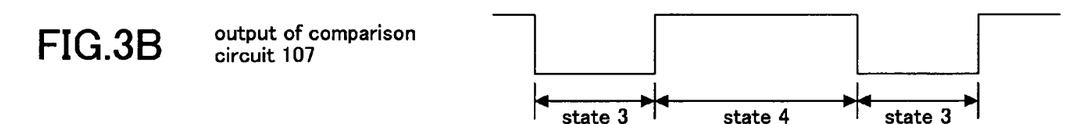
Figure 3C:
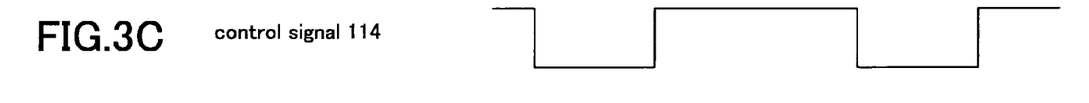
Figure 3D:
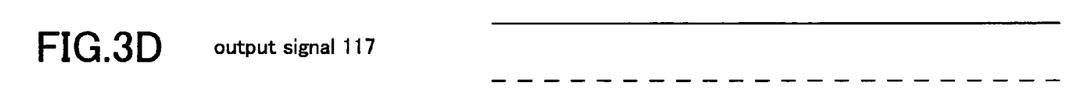
Figure 3E:
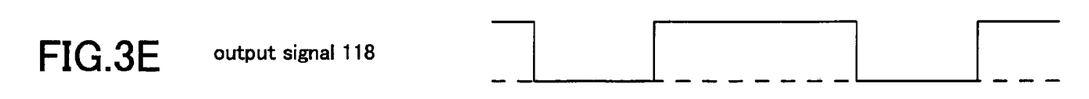
Figure 3F:
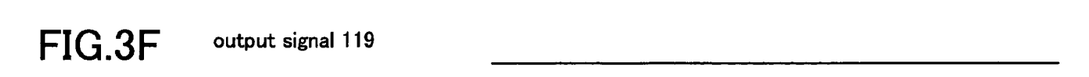
Figure 3G:
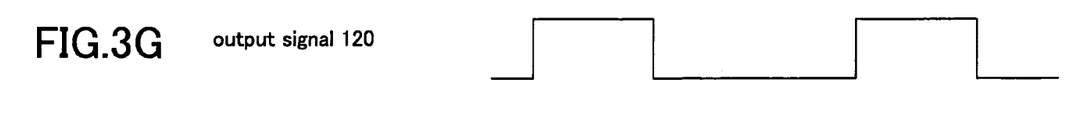

Specifically, FIG. 3A illustrates the reference voltage 104, the output signal of the slope circuit 105, the output signal of the multiplexer 106, and the output signal of the error amplification circuit 103 in the PFM control mode; FIG. 3B illustrates the output signal of the comparison circuit 107 in the PFM control mode; FIG. 3C illustrates the waveform of the control signal 114 from the logic circuit 109; FIG. 3D illustrates the waveform of the output signal 117 from the OR circuit 109a, FIG. 3E illustrates the waveform of the output signal 118 from the OR circuit 109b, FIG. 3F illustrates the waveform of the output signal 119 from the NOR circuit 109d, and FIG. 3G illustrates the waveform of the output signal 120 from the inverter circuit 109g.

In FIG. 3B, "state 3" indicates a state in which the switching transistor 111 is turned ON; "state 4" indicates a state in which the switching transistor 111 is turned OFF.

In FIG. 3A, the reference voltage 104 is indicated by thin dashed lines, the output signal of the slope circuit 105 is indicated by dotted-dashed lines, the output signal of the multiplexer 106 is indicated by thick dashed lines, and the output signal of the error amplification circuit 103 is indicated by solid lines.

In the PFM control mode, the output signal of the PWM/PFM switching circuit 110 is at the low level. Due to this, the low level signal is constantly applied on one of the input terminals of the OR circuit 109b, the high level signal is constantly applied on one of the input terminals of the OR circuit 109a, hence, the output signal 117 of the OR circuit 109a is constantly at the high level.

In addition, in the PFM control mode, since the workload is low, energy is excessively transmitted to the output side. For this reason, the output signal from the error amplification circuit 103 becomes lower than the offset voltage of the slope circuit 105.

First, descriptions are made of operations of the switching regulator 100 in the state 3.

In the state 3, since the switching transistor 111 is turned ON, the control signal 114, which is applied on the gate of the switching transistor 111, is at the low level.

In the state 3, an inductor current I1x of the inductor 112 increases and charges are removed from the output condenser 113, which serves as a smoothing circuit; thus, the output voltage Vo of the switching regulator 100 increases. For this reason, the output voltage from the error amplification circuit 103 decreases. In addition, since the control signal 114 is at the low level, the slope circuit 105 generates a slope signal and outputs the slope signal.

In this state, since the output signal from the comparison circuit 107 is at the low level, a low level signal from the comparison circuit 107 is input to one input terminal of each of the OR circuit 109a and the OR circuit 109b. As a result, as described above, the output signal 117 of the OR circuit 109a is constantly at the high level.

The low level signal from the comparison circuit 107 and a low level signal from the PWM/PFM switching circuit 110 are input to the OR circuit 109b. As a result, the output signal 18 of the OR circuit 109b becomes the low level. That is, a low level select input signal is input to the select input terminal of the multiplexer 106.

The multiplexer 106 outputs the reference voltage 104 when the low level select input signal is input. Hence, the reference voltage 104 is input to the inverted input terminal of the comparison circuit 107.

The comparison circuit 107 compares the slope signal output from the slope circuit 105 to the reference voltage 104, and outputs the comparison results.

In the state 3, since the reference voltage 104 is higher than the slope signal, the comparison circuit 107 outputs the low level signal. When the slope signal becomes higher than the reference voltage 104, the comparison circuit 107 outputs the high level signal.

When the output signal of the comparison circuit 107 becomes the high level, the high level signal from the comparison circuit 107 is input to one input terminal of each of the OR circuit 109a and the OR circuit 109b. Thus, the high level signal from the comparison circuit 107 and a low level signal from the PWM/PFM switching circuit 110 are input to the OR circuit 109b; as a result, the output signal 118 of the OR circuit 109b becomes the high level. That is, a high level select input signal is input to the select input terminal of the multiplexer 106.

Since the output signal 117 of the OR circuit 109a is constantly at the high level, the output signal 119 of the latch flip-flop block constituted by the NOR circuits 109c, 109d is constantly at the low level.

Hence, the low level output signal 119 is input to one of the input terminals of the NOR circuit 109e, and the output signal 120, which is the inverted signal of the output signal 118, is input to the other one of the input terminals of the NOR circuit 109e.

As a result, the output signal of the NOR circuit 109e (namely, the control signal 114) becomes the high level. When the control signal 114 becomes the high level, the switching transistor 111 is turned off, and the switching regulator 100 transits to the state 4, as illustrated in FIG. 3B.

In the state 4, since the switching transistor 111 is turned OFF, the inductor current I1x of the inductor 112 decreases, and charges flow out from the output condenser 113, which serves as a smoothing circuit; thus, the output voltage Vo of the switching regulator 100 decreases. For this reason, the output voltage from the error amplification circuit 103 increases. In addition, since the control signal 114 is at the high level, the slope circuit 105 outputs the offset voltage. Further, since the select input signal of the multiplexer 106 is at the high level, the multiplexer 106 outputs the output voltage from the error amplification circuit 103.

The comparison circuit 107 compares the offset voltage output from the slope circuit 105 to the output signal from the error amplification circuit 103. Here, since the output signal from the error amplification circuit 103 is lower than the offset voltage output from the slope circuit 105, the comparison circuit 107 outputs a high level signal.

In the state 4, when the output signal from the error amplification circuit 103 becomes higher than the offset voltage output from the slope circuit 105, the comparison circuit 107 outputs a low level signal.

When the output signal of the comparison circuit 107 becomes the low level, the low level signal from the comparison circuit 107 is input to one input terminal of each of the OR circuit 109a and the OR circuit 109b. Here, the low level signal from the comparison circuit 107 and the low level signal from the PWM/PFM switching circuit 110 are input to the OR circuit 109n; as a result, the output signal 118 of the OR circuit 109b becomes the low level. That is, the select input signal of the multiplexer 106 becomes the low level, again.

Since the output signal 117 of the OR circuit 109a is constantly at the high level, the output signal 119 of the latch flip-flop block constituted by the NOR circuits 109c, 109d is constantly at the low level. Hence, the low level output signal 119 is input to one of the input terminals of the NOR circuit 109e, and the high level output signal 120, which is obtained by inverting the low level output signal 118 with the inverter circuit 109g, is input to the other one input terminal of the NOR circuit 109e.

As a result, the output signal of the NOR circuit 109e (namely, the control signal 114) becomes the high level. When the control signal 114 becomes the high level, the switching transistor 111 is turned off, and the switching regulator 100 transits to the state 3 again, as illustrated in FIG. 3B.

In this way, the switching regulator 100 repeatedly transits from the state 3 to the state 4, and from the state 4 to the state 3.

As described above, in the present embodiment, in the PFM control mode, when the switching transistor 111 is turned OFF, the multiplexer 106 outputs the reference voltage 104, when the switching transistor 111 is turned ON, the multiplexer 106 outputs the output voltage from the error amplification circuit 103.

In the present embodiment, in the PFM control mode, due to the configuration of the logic circuit 109, the output signal of the comparison circuit 107, the control signal 114, and the select input signal of the multiplexer 106 have the same logic properties.

Because of the above configuration, in the switching regulator 100 of the present embodiment, the error amplification circuit 103 and the comparison circuit 107 can be used in both the PFM control mode and the PMM control mode. Due to this, it is possible to prevent variation of the output voltage caused by differences of the offset voltages of different circuit elements. In addition, by using the error amplification circuit 103 and the comparison circuit 107 in both the PFM control mode and the PMM control mode, it is possible to prevent increase of the number of circuits, and this reduces the power consumption of the switching regulator. Further, since the oscillation circuit 108 is not used in the PFM control mode, the oscillation circuit 108 can be stopped in the PFM control mode, and this can further reduce the power consumption.

In this case, it is preferable that the oscillation circuit 108 have an enable signal input terminal, which receives an enable signal to enable operations of the oscillation circuit 108. This enable signal input terminal may be connected to the output terminal of the PWM/PFM switching circuit 110, and the output terminal of the PWM/PFM switching circuit 110 may be used as the enable signal of the oscillation circuit 108.

For example, in the PMM control mode, since the output terminal of the PWM/PFM switching circuit 110 is at the high level, the high level enable signal for enabling operations of the oscillation circuit 108 is input to the enable signal input terminal. In the PFM control mode, since the output terminal of the PWM/PFM switching circuit 110 is at the low level, the low level enable signal is input to the enable signal input terminal to disable operations of the oscillation circuit 108.

With the above configuration, it is possible to further reduce the power consumption of the switching regulator 100.

Second Embodiment

Figure 4:
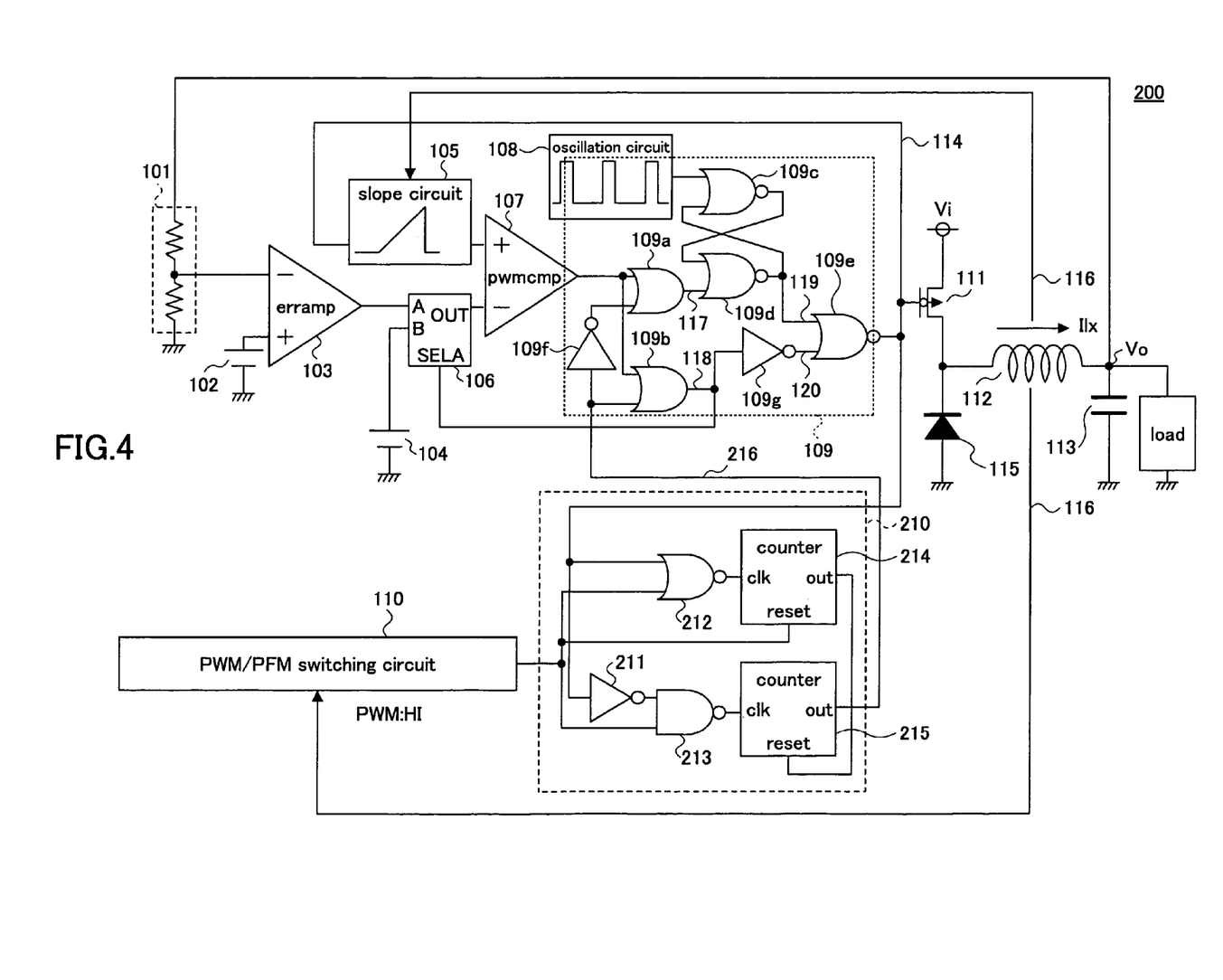
FIG. 4 is a block diagram illustrating a switching regulator 200 according to a second embodiment of the present invention.

FIG. 4 is a block diagram illustrating a switching regulator 200 according to a second embodiment of the present invention.

The switching regulator 200 shown in FIG. 4 is different from the switching regulator 100 shown in FIG. 1 in that a delay circuit 210 is further provided.

In the following descriptions, the same reference numbers are assigned to the same components as described previously, and the overlapping descriptions are omitted.

The delay circuit 210 is described below.

The delay circuit 210 is provided between the logic circuit 109 and the PWM/PFM switching circuit 110, and operates when the operation mode is switched from the PWM control mode to the PFM control mode, or from the PFM control mode to the PWM control mode.

The delay circuit 210 includes an inverter circuit 211, a NOR circuit 212, a NAND circuit 213, and counters 214, 215. The NOR circuit 212 outputs an inverted logical sum of the output signal of the PWM/PFM switching circuit 110 and the control signal 114. The output signal of the NOR circuit 212 becomes a clock input signal of the counter 214, and the output signal of the PWM/PFM switching circuit 110 becomes a reset signal of the counter 214. Further, the output signal of the counter 214 becomes a reset signal of the counter 215.

The NAND circuit 213 outputs a logical AND of the output signal of the PWM/PFM switching circuit 110 and a signal obtained by inverting the control signal 114 with the inverter circuit 211. The output signal of the NAND circuit 213 becomes a clock input signal of the counter 215; the output signal of the counter 215, which acts as the output signal 216 of the delay circuit 210, is input to the logic circuit 109. Specifically, the output signal 216 is applied on the input terminals of the OR circuit 109b and the inverter circuit 109f which constitute the logic circuit 109.

In the present embodiment, once the reset signals to the counters 214, 215 are removed, that is, the reset conditions of the counters 214, 215 are released, after a certain number of the clock signals are input, the counters 214, 215 continuously output high level signals until the counters 214, 215 are reset again.

In the present embodiment, operations of the switching regulator 200 in the PWM control mode and the PFM control mode are similar to operations of the switching regulator 100 in the first embodiment, and descriptions are omitted.

Below, with reference to FIG. 5A through FIG. 5F, and FIG. 6A through FIG. 6F, operations of the switching regulator 200 are described when the operation mode of the switching regulator 200 is switched from the PWM control mode to the PFM control mode, or from the PFM control mode to the PWM control mode.

FIG. 5A through FIG. 5F are waveform diagrams illustrating operations of the switching regulator 200 when the operation mode of the switching regulator 200 is switched from the PWM control mode to the PFM control mode.

Figures 5A, 5B:
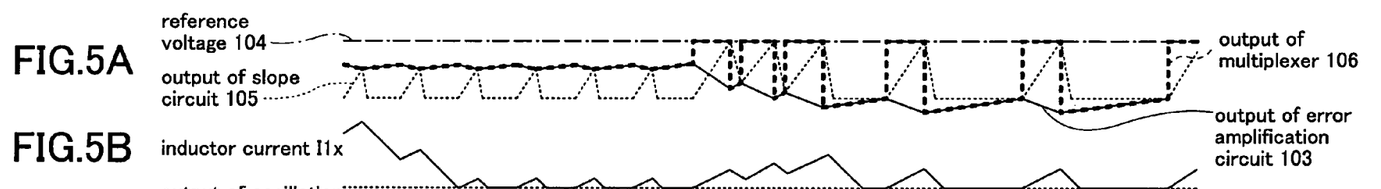
Figure 5C:
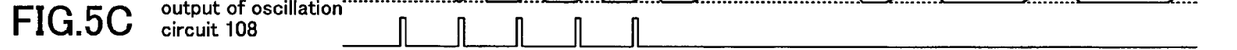
Figure 5D:
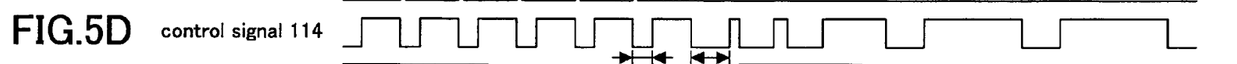
Figures 5E, 5F:
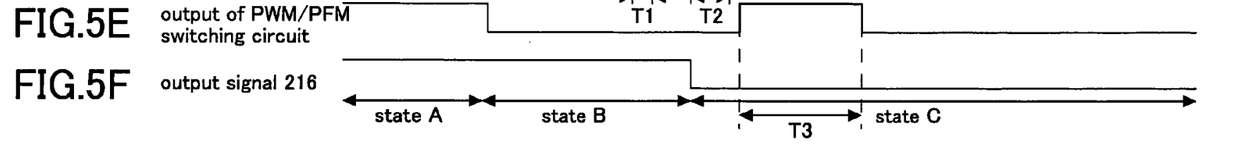

Specifically, FIG. 5A illustrates the output signal of the error amplification circuit 103, the reference voltage 104, the output signal of the slope circuit 105, and the output signal of the multiplexer 106; FIG. 5B illustrates the inductor current I1x; FIG. 5C illustrates the output signal of the oscillation circuit 108; FIG. 5D illustrates the control signal 114 from the logic circuit 109; FIG. 5E illustrates the output signal of the PWM/PFM switching circuit 110; and FIG. 5F illustrates the output signal 216 from the delay circuit 210.

In FIG. 5A, the output signal of the error amplification circuit 103 is indicated by solid lines, the reference voltage 104 is indicated by dotted-dashed lines, the output signal of the slope circuit 105 is indicated by thin dashed lines, and the output signal of the multiplexer 106 is indicated by thick dashed lines.

First, in a state A as shown in FIG. 5F, since the inductor current does not have the zero value, that is, the switching regulator 200 is in the inductor current continuous mode, the operation mode of the switching regulator 200 is the PWM control mode, and the output signal of the PWM/PFM switching circuit 110 is at the high level.

Thus, the high level signal is input to the reset input terminal of the counter 214 to reset the counter 214. Further, since the output signal of the PWM/PFM switching circuit 110 is at the high level, the output signal of the NAND circuit 213 is constantly at the high level, thus, the output signal of the counter 215, namely, the output signal 216 of the delay circuit 210, is constantly at the high level in the PWM control mode. As a result, the high level signal is constantly input to the logic circuit 109, and the switching regulator 200 operates in the PWM control mode, as described in the previous embodiment.

Next, in a state B as shown in FIG. 5F, since the inductor current has the zero values, that is, the switching regulator 200 is in the inductor current discontinuous mode, the PWM/PFM switching circuit 110 detects the inductor current discontinuous mode, and the switching regulator 200 switches the operation mode from the PWM control mode to the PFM control mode. As result, the output signal of the PWM/PFM switching circuit 110 changes from the high level to the low level.

Because the inductor current discontinuous mode corresponds to a state in which the switching transistor 111 is turned OFF, and the inductor current I1x of the inductor 112 decreases, when the PWM/PFM switching circuit 110 detects the inductor current discontinuous mode, the control signal 114 is at the high level.

Thus, when the operation mode of the switching regulator 200 is switched from the PWM control mode to the PFM control mode, the high level control signal 114 and the low level output signal of the PWM/PFM switching circuit 110 are input to the NOR circuit 212. When the high level signal is input to the clock input terminal of the counter 214, the counter 214 starts counting.

At this moment, the output signal of the PWM/PFM switching circuit 110 and the inverted control signal 114 by the inverter circuit 211 are input to the NAND circuit 213, the output signal of the NAND circuit 213 becomes the high level. The high level signal is input to the clock input terminal of the counter 215, thus the output signal of the counter 215, namely, the output signal 216 of the delay circuit 210, remains at the high level.

A state C as shown in FIG. 5F corresponds to a state in which the counter 214 finishes counting. In the state C, when the counter 214 finishes counting, the output signal of the counter 214 becomes the high level. This high level signal is input to the reset input terminal of the counter 215 to reset the counter 215. Thus, the output signal of the counter 215, namely, the output signal 216 of the delay circuit 210, becomes the low level.

When the output signal 216 of the delay circuit 210 becomes the low level, the low level signal is input to the logic circuit 109, and the switching regulator 200 operates in the PFM control mode, as described in the previous embodiment.

In this way, because of the delay circuit 210, when the operation mode of the switching regulator 200 is switched from the PWM control mode to the PFM control mode, after the PWM/PFM switching circuit 110 detects the inductor current discontinuous mode, the output signal of the PWM/IPFM switching circuit 110 is delayed by a preset time period. Then, the switching regulator 200 is operated in the PWM control mode for a certain time period, and after the low workload state becomes a stable state, the operation mode of the switching regulator 200 is switched to the PFM control mode.

It is known that transient phenomena and ripples on the output voltage occur when the operation mode of the switching regulator 200 is switched from the PWM control mode to the PFM control mode, and the transient phenomena may temporarily cause a low workload state. Therefore, in the temporary low workload state, the inductor current discontinuous mode may occur; if this inductor current discontinuous mode is detected, the oscillation circuit 108 is stopped; thus, when the inductor current continuous mode occurs again, it is necessary to re-start the oscillation circuit 108, and this process usually takes time, and this causes response delay.

In the present embodiment, due to the delay circuit 210, switching of the operation mode is performed after the switching regulator 200 changes to the usual state; hence, the state of the switching regulator 200 is not affected by the above temporary state change.

In the present embodiment, when the operation mode of the switching regulator 200 is switched from the PWM control mode to the PFM control mode, it is preferable to set the time interval of the ON state in the PFM control mode to be greater than the time interval of an ON state in the PWM control mode.

Specifically, as shown in FIG. 5D and FIG. 5F, a time period T1 in the state B is shorter than a time period T2 in the state C.

The ON state time interval in the PFM control mode may be determined by the voltage of the reference voltage 104, or the slope of the slope signal generated by the slope circuit 105. In the present embodiment, for example, the voltage of the reference voltage 104 is given an appropriate value so that the ON state time interval in the PFM control mode is greater than the ON state time interval in the PWM control mode.

It is known that when switching the operation mode of the switching regulator 200 from the PWM control mode to the PFM control mode based on detection of the inductor current discontinuous mode, at the time of switching the operation mode, switching from the PWM control mode to the PFM control mode or from the PFM control mode to the PWM control mode may repeatedly occur.

To solve this problem, as in the present embodiment, if the ON state time interval in the PFM control mode is set to be sufficiently longer than the ON state time interval in the PWM control mode, at the time when the operation mode of the switching regulator 200 is switched from the PWM control mode to the PFM control mode, the time period (the ON state time interval) for switching the switching regulator 200 is long, and by switching only once, a relatively large inductor current I1x flows to the output side. Due to this, the output voltage increases, and the output voltage of the error amplification circuit 103 can be reduced greatly; thus, during the transition to the PFM control mode, the number of counting operations of the counter 215 can be decreased, and it is possible to prevent the operation mode of the switching regulator 200 from returning to the PWM control mode.

In addition, when switching the operation mode of the switching regulator 200 from the PWM control mode to the PFM control mode, the control operations of the inductor current may be performed in small duty steps instead of a control operation within a long ON state interval. Due to this, after the operation mode of the switching regulator 200 is switched from the PWM control mode to the PFM control mode, although the magnitude of the average inductor current I1$x$ transmitted to the output side does not change, the inductor current discontinuous mode does not occur, and the inductor current continuous mode can be obtained continuously.

In this way, by adjusting the ON state time interval in the PFM control mode and the PMM control mode, it is possible to prevent unnecessary repeated switching of the PWM control mode and the PFM control mode at the time of switching the operation mode, and to enable switching operations of hysteresis.

In addition, in the state C as shown in FIG. 5F, immediately after the operation mode of the switching regulator 200 is switched from the PWM control mode to the PFM control mode, the output voltage of the error amplification circuit 103 increases more or less, as shown in FIG. 5A. For this reason, the OFF state time interval of the switching regulator 200 becomes short, the inductor current I1$x$ increases, and temporarily, the inductor current I1$x$ becomes continuous (namely, in the inductor current continuous mode), as shown in FIG. 5B in a time period T3 illustrated in FIG. 5F. When detecting the inductor current continuous mode, the PWM/PFM switching circuit 110 outputs a high level signal to switch the operation mode of the switching regulator 200 to the PWM control mode.

Subsequently, the counter 214 is reset, and the clock signal is input to the clock input terminal of the counter 215; thereby, the counter 215 starts counting. Since the switching regulator 200 is in the PFM control mode in the time period T3, and because of the sufficiently large ON state time interval, a large inductor current I1$x$ is output. For this reason, before the counter 215 finishes counting, the inductor current I1$x$ returns to zero again, resulting in the inductor current discontinuous mode. The PWM/PFM switching circuit 110 detects the inductor current discontinuous mode, and changes the output signal to the low level again; due to this, the output signal 216 of the delay circuit 210 changes to the low level again before the delay time of the delay circuit 210 elapses. Therefore, the output signal 216 of the delay circuit 210 remains in the low level in the state C, and switching to the PWM control mode does not happen.

As described above, according to the delay circuit 210 of the present embodiment, even when the inductor current I1$x$ becomes the inductor current continuous mode immediately after the operation mode of the switching regulator 200 is switched from the PWM control mode to the PFM control mode, it is possible to prevent repeating switching to the PWM control mode.

Next, with reference to FIG. 6A through FIG. 6F, operations of the switching regulator 200 are described when the operation mode of the switching regulator 200 is switched from the PFM control mode to the PWM control mode.

FIG. 6A through FIG. 6F are waveform diagrams illustrating operations of the switching regulator 200 when the operation mode of the switching regulator 200 is switched from the PFM control mode to the PWM control mode.

Figure 6A:
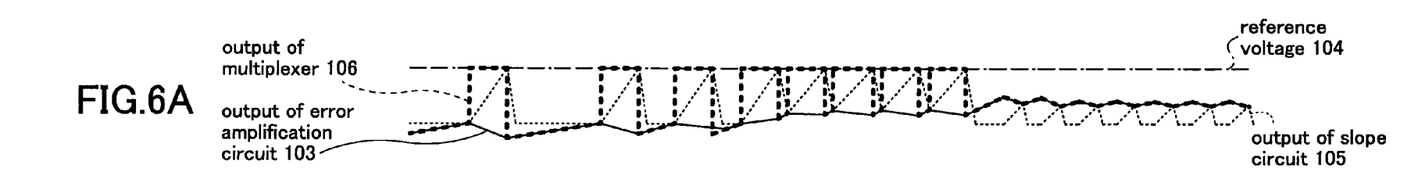
Figure 6B:
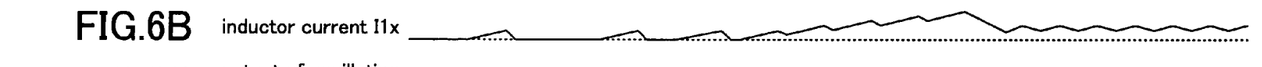
Figure 6C:
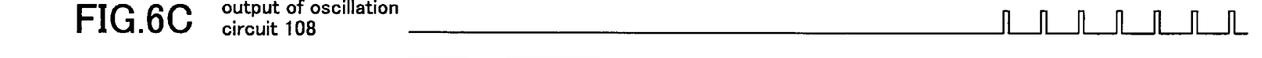
Figure 6D:
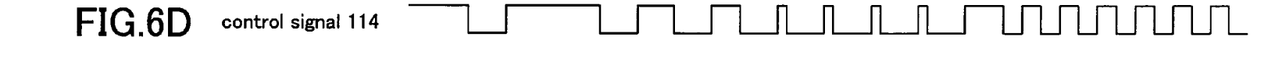
Figure 6E:
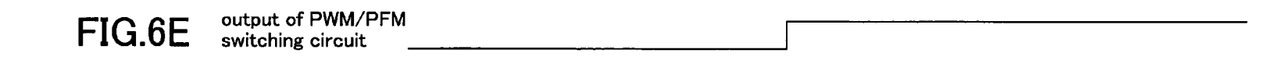

Specifically, FIG. 6A illustrates the output signal of the error amplification circuit 103, the reference voltage 104, the output signal of the slope circuit 105, and the output signal of the multiplexer 106; FIG. 6B illustrates the inductor current I1$x$; FIG. 6C illustrates the output signal of the oscillation circuit 108; FIG. 6D illustrates the control signal 114 from the logic circuit 109; FIG. 6E illustrates the output signal of the PWM/PFM switching circuit 110; and FIG. 6F illustrates the output signal 216 from the delay circuit 210.

In FIG. 6A, the output signal of the error amplification circuit 103 is indicated by solid lines, the reference voltage 104 is indicated by dotted-dashed lines, the output signal of the slope circuit 105 is indicated by thin dashed lines, the output signal of the multiplexer 106 is indicated by thick dashed lines.

Figure 6F:
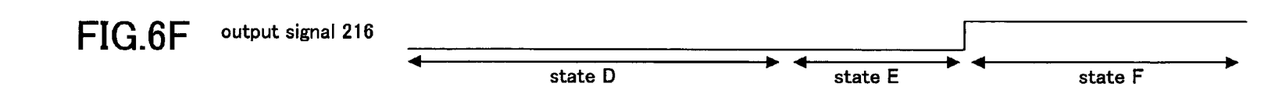

First, in a state D as shown in FIG. 6F, the switching regulator 200 is operating in the PFM control mode, the output signal of the PWM/PFM switching circuit 110 is at the low level, and the output signal 216 of the delay circuit 210 is at the low level.

In a state E as shown in FIG. 6F, since the inductor current does not have the zero value, that is, the switching regulator 200 is in the inductor current continuous mode, the PWM/PFM switching circuit 110 detects the inductor current continuous mode, and the operation mode of the switching regulator 200 is switched from the PFM control mode to the PWM control mode. As result, the output signal of the PWM/PFM switching circuit 110 changes from the low level to the high level.

When the operation mode of the switching regulator 200 is switched to the PWM control mode, the reset input signal to the counter 214 becomes the high level, and the counter 214 is reset. When the counter 214 is reset, the output signal from the counter 214 changes from the high level to the low level, thus, the reset condition of the counter 215 is released.

In the present embodiment, after the reset conditions of the counters 214, 215 are released, after a certain number of the clock signals are input, the counters 214, 215 continuously output high level signals until the counters 214, 215 are reset again. Hence, after a certain number of the clock signals are input in the state E, the counter 215 outputs a high level signal. Namely, the output signal 216 of the delay circuit 210 becomes the high level, resulting in transition to a state F.

In the state F, a high level signal is input to the logic circuit 109, and the switching regulator 200 starts to operate in the PWM control mode, as described in the previous embodiment.

Note that here, the "clock signal" means the inverted control signal 114.

In this way, because of the delay circuit 210, when the operation mode of the switching regulator 200 is switched from the PFM control mode to the PWM control mode, after the PWM/PFM switching circuit 110 detects the inductor current continuous mode, the output signal of the PWM/PFM switching circuit 110 is delayed by a preset time period. Then, the switching regulator 200 is operated in the PFM control mode for a certain time period, and after the low workload state becomes stable, the operation mode of the switching regulator 200 is switched to the PWM control mode.

In the present embodiment, in the PWM control mode, since the switching operations are repeated for short ON state time interval, it is possible to reduce ripples on the output voltage compared to switching operations of long periods.

In the present embodiment, when switching the operation mode of the switching regulator 200 from the PWM control mode to the PFM control mode, it is preferable that the delay time of the delay circuit 210 be assigned such a value that enables prevention of unnecessary repeating switching of the operation mode of the switching regulator 200, which is caused by variation of the output voltage, such as ringing of the output voltage due to load transients.

Whereas, when switching the operation mode of the switching regulator 200 from the PFM control mode to the PWM control mode, it is preferable that the delay time of the delay circuit 210 be assigned such a value that does not influence transition to the PWM control mode.

According to the present embodiment, in the switching regulator 200 of the present embodiment, the error amplification circuit 103 and the comparison circuit 107 can be used in both the PFM control mode and the PMM control mode. Due to this, it is possible to prevent variation of the output voltage caused by differences of the offset voltages of different circuit elements. In addition, by using the error amplification circuit 103 and the comparison circuit 107 in both the PFM control mode and the PMM control mode, it is possible to prevent an increase of the number of circuits, and this reduces the power consumption of the switching regulator.

Further, since the oscillation circuit 108 is not used in the PFM control mode, the oscillation circuit 108 can be stopped in the PFM control mode, and this can further reduce the power consumption.

In addition, because of the delay circuit 210, it is possible to prevent unstable operations immediately after the operation mode switching, and the operation mode switching is performed after the operation becomes stable.

In addition, by setting the ON state time interval in the PFM control mode to be longer than the ON state time interval in the PWM control mode, it is possible to prevent unnecessary repeating switching from the PWM control mode to the PFM control mode, or from the PFM control mode to the PWM control mode, and this enables switching operations of hysteresis.

The present invention is applicable to a switching regulator operating in a PWM control mode and a PFM control mode.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2006-081520 filed on Mar. 23, 2006, the entire contents of which are hereby incorporated by reference.

What is claimed is:

1. A switching regulator operating in one of a PWM control mode and a PFM control mode, comprising:
    a switching unit that performs switching between the PWM control mode and the PFM control mode;
    an error amplification circuit that amplifies an error voltage between a voltage proportional to an output voltage and a first reference voltage;
    a slope circuit that generates a slope signal when activated by a control signal used to turn on an output switching transistor, said slope circuit outputting a predetermined offset voltage when the control signal turns the output switching transistor off;
    a reference voltage generation circuit that generates a second reference voltage for determining a time interval of an ON state in the PFM control mode;
    a multiplexer that outputs one of the second reference voltage and an output voltage from the error amplification circuit;
    a comparison circuit that compares an output voltage from the slope circuit to an output voltage from the multiplexer; and
    an oscillation circuit that determines a timing of the ON state in the PWM control mode.

2. The switching regulator as claimed in claim 1, wherein the time interval of the ON state in the PFM control mode is greater than a time interval of an ON state in the PWM control mode.

3. The switching regulator as claimed in claim 2, wherein the time interval of the ON state in the PFM control mode is determined by at least one of the second reference voltage and a slope of the slope signal.

4. The switching regulator as claimed in claim 1, wherein the oscillation circuit is stopped in the PFM control mode.

5. The switching regulator as claimed in claim 1, further comprising:
    a delay unit that delays an output signal from the switching unit by a predetermined time period.

6. The switching regulator as claimed in claim 5, wherein the switching regulator repeatedly performs a predetermined number of switching operations within the predetermined time period.

* * * * *